(12) United States Patent
Schmidt (10) Patent No.: US 10,171,465 B2
(45) Date of Patent: Jan. 1, 2019

(54) NETWORK AUTHORIZATION SYSTEM AND METHOD USING RAPIDLY CHANGING NETWORK KEYS

(71) Applicant: Helene E. Schmidt, Newark, DE (US)

(72) Inventor: Helene E. Schmidt, Newark, DE (US)

(*) Notice: Subject to any disclaimer, the term of this patent is extended or adjusted under 35 U.S.C. 154(b) by 294 days.

(21) Appl. No.: 15/279,992

(22) Filed: Sep. 29, 2016

(65) Prior Publication Data

US 2018/0091507 A1    Mar. 29, 2018

(51) Int. Cl.
*G06F 7/04*     (2006.01)
*H04L 29/06*    (2006.01)

(52) U.S. Cl.
CPC ........ *H04L 63/0876* (2013.01); *H04L 63/123* (2013.01); *H04L 2463/121* (2013.01)

(58) Field of Classification Search
CPC ..... H04L 63/08; H04L 63/102; H04L 63/083; G06F 21/6218
See application file for complete search history.

(56) References Cited

U.S. PATENT DOCUMENTS

| | | | |
|---|---|---|---|
| 5,590,199 A | 12/1996 | Krajewski et al. | |
| 5,734,718 A | 3/1998 | Prafullchandra | |
| 6,088,799 A * | 7/2000 | Morgan | G06F 21/31 380/279 |
| 6,105,012 A | 8/2000 | Chang et al. | |
| 6,182,220 B1 | 1/2001 | Chen et al. | |
| 6,735,310 B1 * | 5/2004 | Hsing | G06F 21/31 380/28 |
| 6,826,690 B1 * | 11/2004 | Hind | G06F 21/31 713/173 |
| 7,243,226 B2 | 7/2007 | Newcombe et al. | |
| 7,290,040 B2 | 10/2007 | Newcombe et al. | |
| 7,434,062 B2 | 10/2008 | Erez | |
| 7,451,147 B1 | 11/2008 | Kao et al. | |
| 7,587,045 B2 | 9/2009 | Yeung et al. | |
| 7,685,416 B2 | 3/2010 | Newcombe et al. | |
| 7,757,275 B2 | 7/2010 | Crall et al. | |
| 7,865,943 B2 | 1/2011 | Hayler et al. | |
| 7,958,544 B2 | 6/2011 | Chen et al. | |
| 7,970,143 B2 | 6/2011 | Vennelakanti et al. | |
| 8,023,647 B2 | 9/2011 | Shaik | |
| 8,041,818 B2 | 10/2011 | Gupta et al. | |
| 9,692,757 B1 * | 6/2017 | Mikulski | H04L 63/0876 |
| 2001/0052083 A1 | 12/2001 | Willins et al. | |

(Continued)

*Primary Examiner* — Ali S Abyaneh
(74) *Attorney, Agent, or Firm* — Gunn, Lee & Cave, P.C.

(57) ABSTRACT

A method for authenticating a client device for access to a host device based on timestamps. When the client device wants to access the host, it generates a first timestamp and sends the host device the first timestamp and the character strings from host tables related to the value of time units of the first timestamp. The host tables are known to all authorized client devices within the network. The strings are ordered according to a sequence table in the client device and the host device. When received, the host device compares the received characters strings to the character strings within its host string table based on an order determined by its host sequence table. If the character strings and order match, the host sends the client a second timestamp and the process is repeated using the second timestamp and sequence and string tables associated with, and known only to, the client device and the host device.

2 Claims, 5 Drawing Sheets

(56) References Cited

U.S. PATENT DOCUMENTS

| | | |
|---|---|---|
| 2002/0061106 A1 | 5/2002 | Kilkkila |
| 2002/0087867 A1 | 7/2002 | Oberle et al. |
| 2004/0128500 A1 | 7/2004 | Cihula et al. |
| 2006/0156026 A1 | 7/2006 | Utin |
| 2008/0104672 A1 | 5/2008 | Lunde et al. |
| 2008/0212771 A1* | 9/2008 | Hauser ............... G06F 21/305 380/44 |
| 2009/0217035 A1 | 8/2009 | Ibrahim et al. |
| 2009/0300364 A1* | 12/2009 | Schneider ........... H04L 9/3271 713/178 |
| 2009/0327740 A1 | 12/2009 | Schneider et al. |
| 2010/0058060 A1* | 3/2010 | Schneider ........... H04L 9/0844 713/171 |
| 2010/0088519 A1* | 4/2010 | Tsuruoka ............. G06F 21/33 713/176 |
| 2010/0131756 A1 | 5/2010 | Schneider |
| 2010/0325440 A1 | 12/2010 | Deutschmann et al. |

* cited by examiner

| | Year | 12 Month | 52 Week | 31 Day | 24 Hour | 60 Min | 60 Sec | 1000 milisec |
|---|---|---|---|---|---|---|---|---|
| 0 | | mM9OkqUZ | H1aOX2I8 | qA4C807k | A0wXI1pO | Z4nP98NE | wW02g7r7 | X2s0Wn4H |
| 1 | | P9pjkc9j | X0y3z4iC | T3b2Cd1R | U6mxRz9K | K8usp3Lm | sN0L4E2v | 2nASaW6N |
| 2 | | X5e5dPIL | 5xDXxdea | Q3g3Br6Y | fB1n874s | vF908xmj | 8nB494RQ | tK97780 |
| 3 | | G3kb03kk | 9xURgsyx | pR8t48mN | vV9kmOz1 | uU6qIf8I | IB6HDi1U | 4uDKHg5O |
| 4 | | 5IHYe764 | U3ous71u | 4IS3A38r | IH7gFU0g | W5oAQ0ck | 6zUwhw2L | G0n7gnDi |
| 5 | | K9r5hEI5 | 8wRi4iVz | bF6zBDKW | 8hFoC78Y | sC9Q2IUA | pX27d1oF | zH2Xgs8h |
| 6 | | S9i9JXhv | G1uIEobx | fK1IB4mP | 2tLeA1CN | 2aRLK2L5 | U3qz8q4N | 1ePtk5p |
| 7 | | 2rE9OFmW | xF2JGk9u | I8ow3dN7 | fG1KmmMN | B1an1az6 | X4qNym47 | 6vJlc11k |
| 8 | | hA77GJfX | M7uK63Ac | O8igUAI0 | 9zTO1wjp | yT1x6C6Q | aL3n5bI6 | Q7vF8pII |
| 9 | | 9vVPQ06C | J9k7Wsyk | jN37RfUu | N5IB58WP | Y0tVqat5 | E1rn5WCF | 6rOCCqxr |
| 10 | | eQ963sru | B6rcUWbp | H9bfTPE4 | uN4K8GZ6 | 7aKHHvXS | X3qIRv2o | P8vaumnX |
| 11 | pM28IJ5u | 5yHAO1EZ | B8r3Lgq7 | 4vM7x65u | U3xNKViS | jP4m3k9x | cG0QO8n6 | U9ue7vy1 |
| 12 | AKfCHHBH | | jQ09FQh1 | nF4cXjP3 | U7tPR4LV | 6uY5New0 | vG38csG4 | 9qFHAuF9 |
| 13 | w8tmSWqt | | I5cUl86b | hW87nl2l | U9m73IKV | 7hLKL1tY | 4hI38l1d | 0mDYvXnR |
| 14 | 9JcIdgiL | | nV6kjf49 | 2pDLR5Y9 | T1djSbK0 | kI0f1dbr | 2lQafk26 | nO3CD6vn |
| 15 | j2L0oTv9 | | 1iAH4ZVc | 7gOPuoiS | wZ26h6U3 | 0hUHTC5D | D5gC3JDG | O5ntCg0d |
| 16 | DF1ydfT2 | | 9aU33wp2 | P6z04WQ8 | gN7D74Z6 | 0uQMsCpy | IA0k3e2H | IB5Q69N0 |
| 17 | rIa1ZDuN | | bF3UZ6FU | K2rR694D | mB8R0Rn5 | tD3sy1ko | yF42vXNr | G2o8z29q |
| 18 | urMkTwUJ | | 7rMkp2ga | K3yuq078 | 8uG192tw | dQ8Pjnc9 | 1wGBM3Y2 | 8pDCDAEI |
| 19 | svsrcyuS | | qE387g37 | rY8V75tp | A6dNXEQY | 9rY9c3F1 | rF2M283d | nR2M69iA |
| 20 | xqyzigi0 | | eL0N9vI3 | 3vUaF7A8 | oO554Ftm | mA67FvNG | oD1jZ2MR | P4ps5d76 |
| 21 | 7KMSXYqf | | X1dp8Mg9 | hW7USZwH | 7oYW6Wc1 | 7mOm2n6K | kF4ruHV7 | IR2vMzY8 |
| 22 | 1B32J3HK | | M2iPcCHv | H7tXXMfl | 5tDFk6ZK | P0nr31i9 | B5jU0Y27 | M4sL3HQE |
| 23 | D5IRJAWX | | zQ3o2m0j | F7zQl1jA | 5xYskpG1 | 1Ilyfrs4 | 6qPaFdZ2 | 7jHeDWAo |
| 24 | 9niECML6 | | bN7QZTiR | rH792tiT | | sD03Ir3p | F6swmiT2 | N3rmKZ9j |
| 25 | DGEkP00q | | T6tf490Y | aN8M237t | | 2tDxn9Pf | Z2sDx9pj | uE8P6x3o |
| 26 | ItYzVfNB | | Z5i59S3J | W7ajUKYU | | pE7k9VHm | dW4d5Q7M | 9jTSsJd2 |
| 27 | yiYbrmM6 | | P0x7pks0 | kN9237At | | xI39YtKk | uY1O4Blh | 9fFK349 |
| 28 | IjQMnFr8 | | cJ5s3t7q | T5ugJzub | | IC37mdbt | Z0is8Fhq | 6xY8x0DQ |
| 29 | mLMHsU4w | | E1k5Vr46 | pL93S18v | | dH5X6AdY | J9q0aIgN | 9fX4pWD3 |
| 30 | hvJOgg7Q | | 4mMU4IUQ | Y7yalacf | | rI63iP95 | cN5b5Ayc | 5xH05UU2 |
| 31 | Hq1OstYQ | | | | | U7rRw600 | IK29ah4s | 5uC0Z4go |
| ⋮ | | | | | | | | |
| 999 | | | | | | | | 8wY8i66p |

NETWORK AUTHORIZATION SYSTEM AND METHOD USING RAPIDLY CHANGING NETWORK KEYS

CROSS REFERENCES TO RELATED APPLICATIONS

Not applicable.

FEDERALLY SPONSORED RESEARCH

Not applicable.

BACKGROUND OF THE INVENTION

1. Field of the Invention

This invention relates generally to network security. More specifically, the invention relates to a system and method for ensuring a first network device, such as a client device, is authorized to access a second network device, such as a host device.

2. Background of the Related Art

Many network security methodologies rely on data encryption and/or password protection that uses a static (i.e., unchanging) key or password. While this methodology can prevent unauthorized users from gaining access to certain network devices, a fixed key or password is vulnerable to cracking by capturing sufficient packets or launching a dictionary attack. Therefore, the most efficient way to protect the network from such attacks is to generate the key or password dynamically.

BRIEF SUMMARY OF THE INVENTION

The invention is a system and method for authenticating a client device having a device ID for access to a host device. This system and method are useful, for example, where one party is in communication with a remote device such as to control, monitor, or modify its behavior and requires verification that the connection has not been accessed without authorization.

The method of the present invention comprises the steps of generating a first timestamp with the client device, the first timestamp including data representative of the value of preferably at least two time units; retrieving a first group of character strings from a host string table in the client device, each character string being related within the host string table to the value of a time unit of the first timestamp; concatenating the first group of character strings into a first string set in an order determined by a host sequence table in the client device, the host sequence table relating an order of time units to the value of one of the time units; creating an initiating string with the client device, the initiating string including the device identifier, the first timestamp, and the first string set; sending the initiating string to the host device; retrieving a second group of character strings from a host string table in the host device, each character string being related within the host string table to the value of a time unit of the first timestamp; concatenating the second group of character strings into a second string set in an order determined by a host sequence table in the host device, the host sequence table relating an order of time units to the value of one of the time units; comparing the first string set to the second string set; generating a second timestamp with the host device, the second timestamp preferably including at least two time units; sending the second timestamp to the client device; retrieving a third group of character strings from a client string table in the client device, each character string being related within the client table to the value of a time unit of the second timestamp; concatenating the third group of character strings into a third string set in an order determined by a client sequence table in the client device, the client sequence table relating an order of time units to the value of one of the time units; creating a verification string with the client device, the verification string including the device identifier, the second timestamp, and the third string set; sending the verification string to the host device; retrieving a fourth group of character strings from a client string table in the host device, the client string table being associated with the client device; concatenating the fourth group of character strings into a fourth string set in an order determined by a client sequence table within the host device, the client sequence table associated within the client device and relating an order of time units to the value of one of the time units; and comparing the fourth string set with the third string set.

BRIEF DESCRIPTION OF THE DRAWINGS

FIG. 3 shows an embodiment with a "medium security" host string table described with reference to FIG. 1.

FIG. 4, which consists of FIG. 4A-4C, shows an embodiment of the method of the present invention.

DETAILED DESCRIPTION OF SPECIFIC EMBODIMENTS

Figures 1, 2:
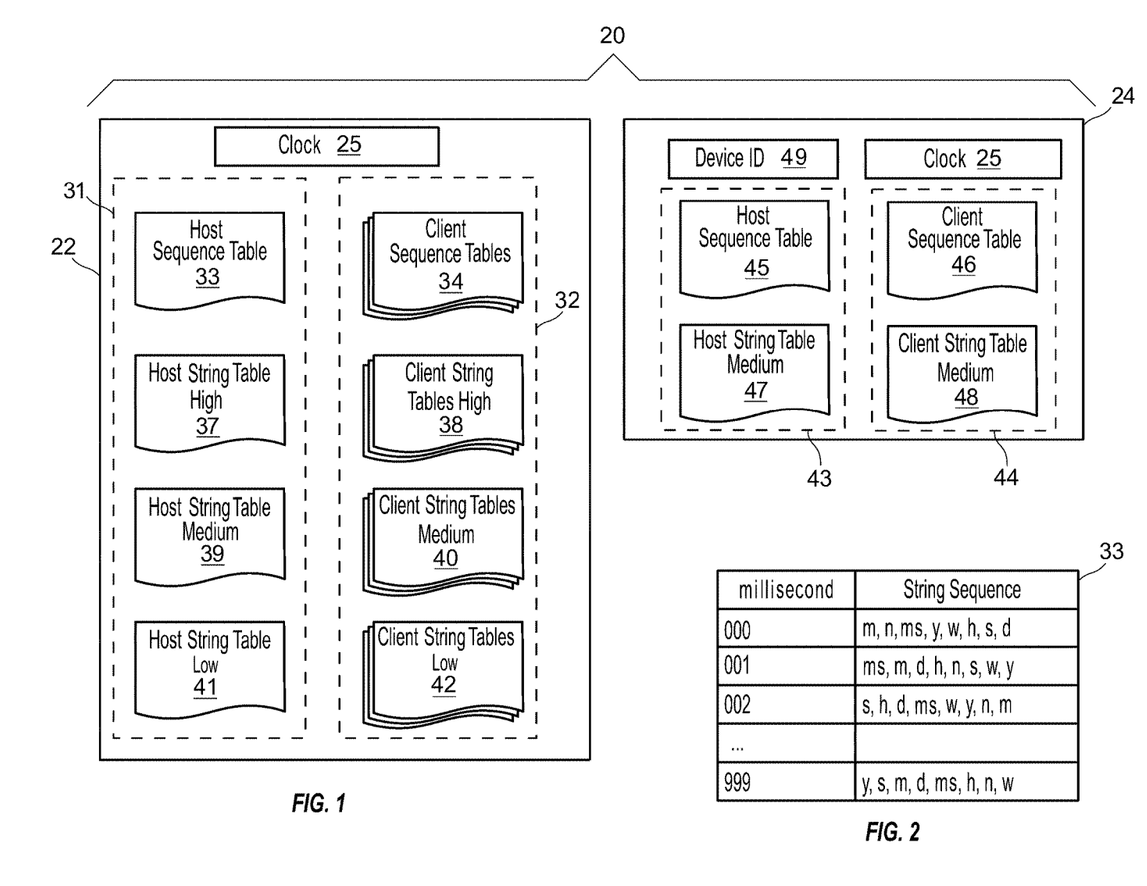
FIG. 1 shows a block diagram of a system embodying the invention.
FIG. 2 shows the a sequence table in the host and client device in more detail.

FIG. 1 shows an embodiment 20 of the invention with a host device 22 and a client device 24. The devices 22, 24 are in network communication and each includes a device clock 25 or other source from which a timestamp can be generated. In this embodiment 20, the timestamp includes eight time units: year (y), month (m), week (w), day of month (d), hour (h), minute (n), second (s), and millisecond (ms).

As used in this description, a "host device" is a network device to which another device, a "client device," may attempt to gain access. While this description contemplates one device acting in a "host" role and another device acting in a "client" role, for other applications the roles could be reversed for the same two devices—that is, "host" or "client" refers to whether the device is requesting or authenticating access rather than specific physical characteristics of the device. Moreover, the devices 22, 24 may be any device residing in a network environment, such as a computer, vehicle, or building embodied with electronics and software to enable network connectivity and the exchange of data with other such devices.

The host device 22 includes a computer readable medium containing a first set of host tables 31 (i.e., data relationships) and a first set of client tables 32. The first set of host tables 31 includes a host sequence table 33 and three host string tables 37, 39 41. The host sequence table 33 relates the value of time units of a timestamp to an order of the time units composing the timestamp.

Referring to FIG. 2, the host sequence table 33 relates the value of the millisecond time unit of the timestamp to an order of the time units. For example, if the millisecond value of the timestamp is "000," the string sequence is "m, n, ms, y, w, h, s, d." If the millisecond value is "002," the string sequence is "s, h, d, ms, w, y, n, m." In this table 33, each sequence is unique and random within the table 33. In alternative embodiments, the host sequence tables may be more or less complicated by, for example, increasing (or decreasing) the number of time units used from the timestamp. If millisecond values are not available then the table can be created using other time units, such as just seconds or minutes and seconds.

Referring back to FIG. 1, each of the host string tables 37, 39, 41 contains randomly generated eight-character strings of characters, with each string related to a time unit of a timestamp. The strings may be formed of a sequence of any types of characters, such as ASCII codes, extended ASCII codes, non-English language characters, and the like. In other embodiments, the strings may be of differing lengths (e.g., some 6 characters, others 7 characters, still others 8 characters, and so on).

In this embodiment 20, the first host string table 37 is a "high security" table, the second host string table 39 is a "medium security" table, and the third table 41 is a "low security" table. The differences between the string tables 37, 39, 41 are generally the complexity of character strings and the amount of data relationships: The higher the security level, the more complex the string and more strings are related to the timestamp (e.g., more time units are used). For example, the "high security" table 37 uses alphanumeric characters and special characters (e.g., @, #, $, %, <, >, &, *) in its character strings and all eight time units of the timestamp. The "medium security" table 39, partially shown in FIG. 3, relates strings of eight alpha-numeric characters (but not special characters) for each possible time unit value. The table includes one thousand rows to account for all possible values for the "millisecond" time unit (0 to 999). The low security table uses less time units and/or less complex data (e.g., only lower case alpha characters).

Referring again to FIG. 1, the first set of client tables 32 includes a first set of client sequence tables 34. Each client sequence table within the set 34 is associated with a client device that may have authorized access to the host device 22 (e.g., client device 24) and relates a time unit of a timestamp to an order of the time units of the timestamp. Each table within the first set of client sequence tables 34 may be, but is preferably not, identical to the host sequence table 33.

The first set of client tables 32 also includes at least one client string table for each client device (e.g., client device 24) that may have authorized access to the host device 22. In this embodiment 20, the first set of client tables 32 includes three sets of client string tables 38, 40, 42. The first set 38 includes "high security" tables, the second set 40 includes "medium security" tables, and the third set 42 includes "low security" tables as previously discussed.

In this embodiment, each table within the client string table sets 38, 40, 42 contains randomly generated eight-character strings of characters, with each string related to a time unit of a timestamp. The strings may be formed of a sequence of any types of characters, such as ASCII codes, extended ASCII codes, non-English language characters, and the like. The strings may also be of differing lengths. Each table within the client string tables 38, 40, 42 may be, but is preferably not, identical to any of the host string tables 37, 39, 41. Moreover, each table is preferably, but not necessarily unique in the host device 22.

Referring now to the client device 24, a computer readable medium contains a second set of host tables 43 and a second set of client tables 44. The second set of host tables 43 includes a second host sequence table 45 that is identical to the first host sequence table 33. The second set of host tables 43 further includes a host string table 47 that is identical to the second host string table 39. The client device 24 has a fixed security level (e.g., in this embodiment, only "medium") and thus requires only one table. Client devices with a variable security level require one table for each possible security level, with each of the tables being identical to a table in the first set of host tables 31.

The second set of client tables 44 is composed of a client sequence table 46 that relates the value of a time unit of a timestamp to an order of the time units composing the timestamp. The client sequence table 46 may be, but is preferably not, identical to the host sequence table 33.

The second set of client tables 44 further includes a client string table 48 that is identical to a table in the second set of client string tables 40 in the host device 22. The client device 24 has a fixed security level (e.g., in this embodiment, only "medium") and requires only one table 48. Client devices with a variable security level require one client string table for each possible security level. The client device 24 also includes a device identifier 49 that is unique to the client device 24 within the network.

Figure 4A:
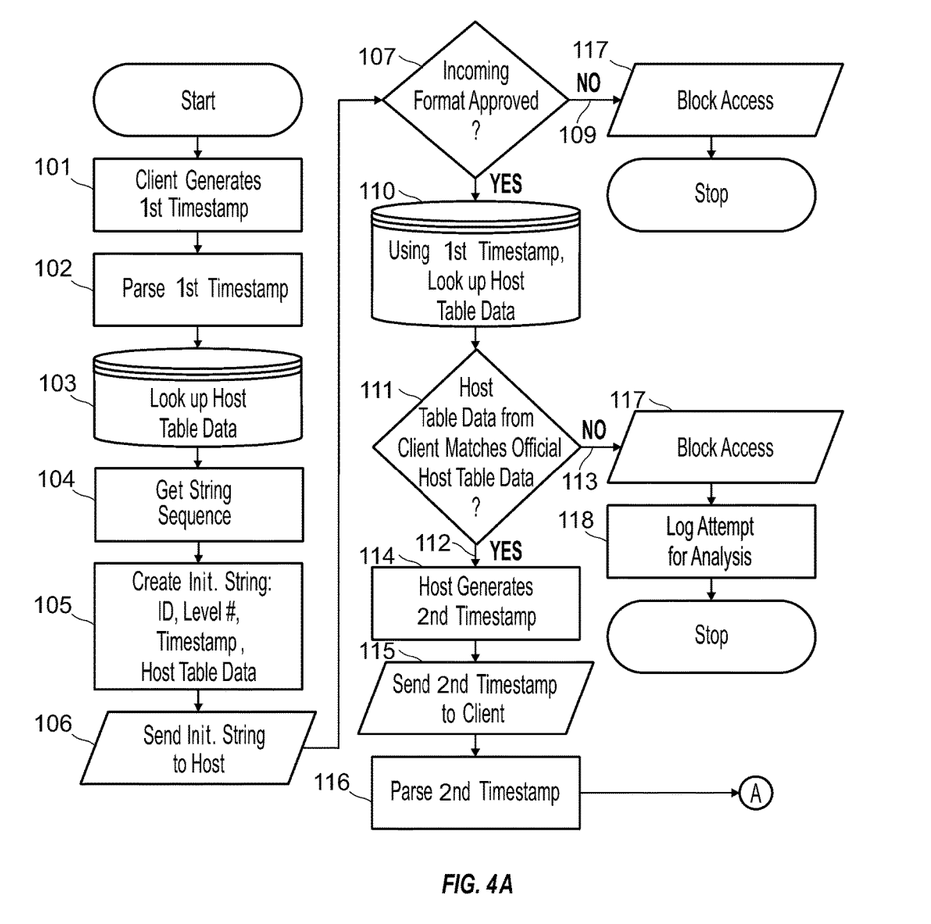
Figure 4B:
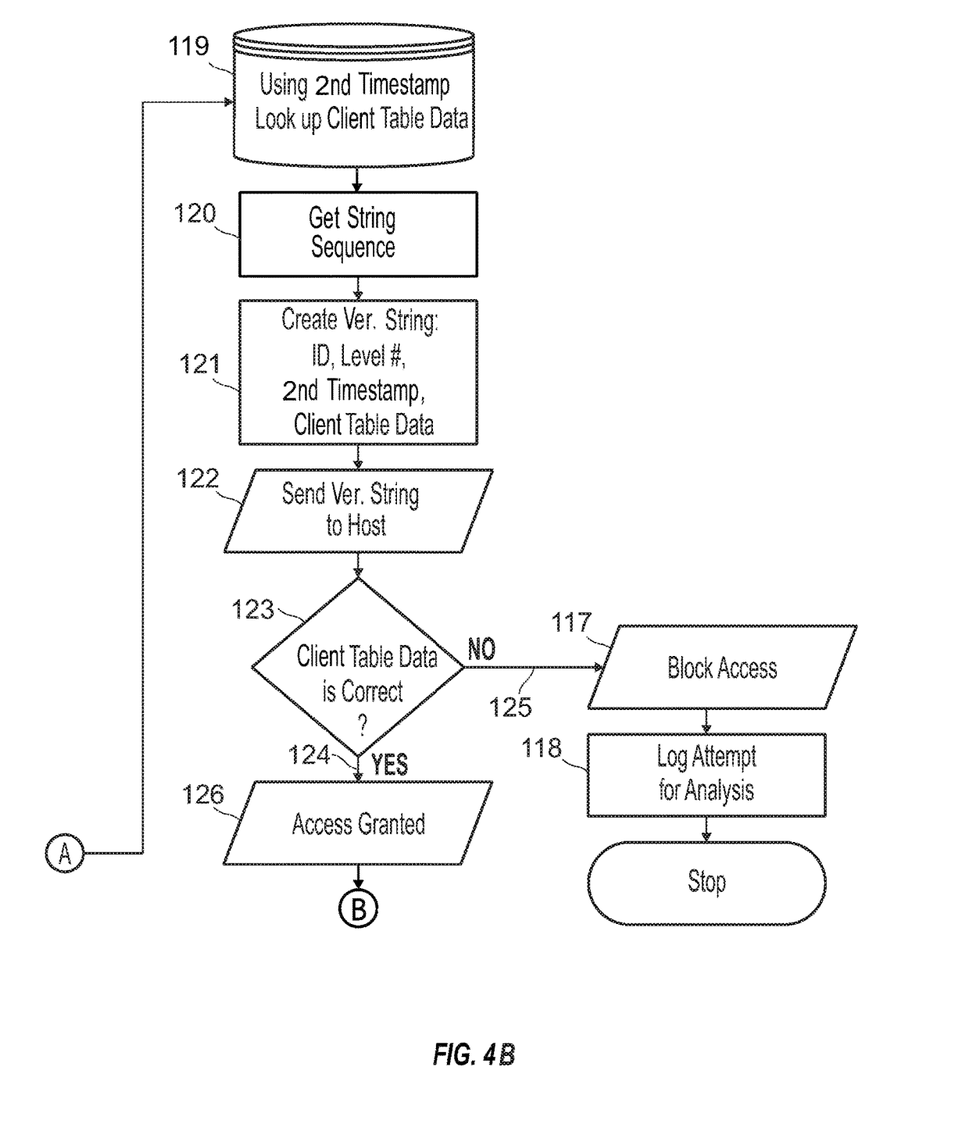
Figure 4C:
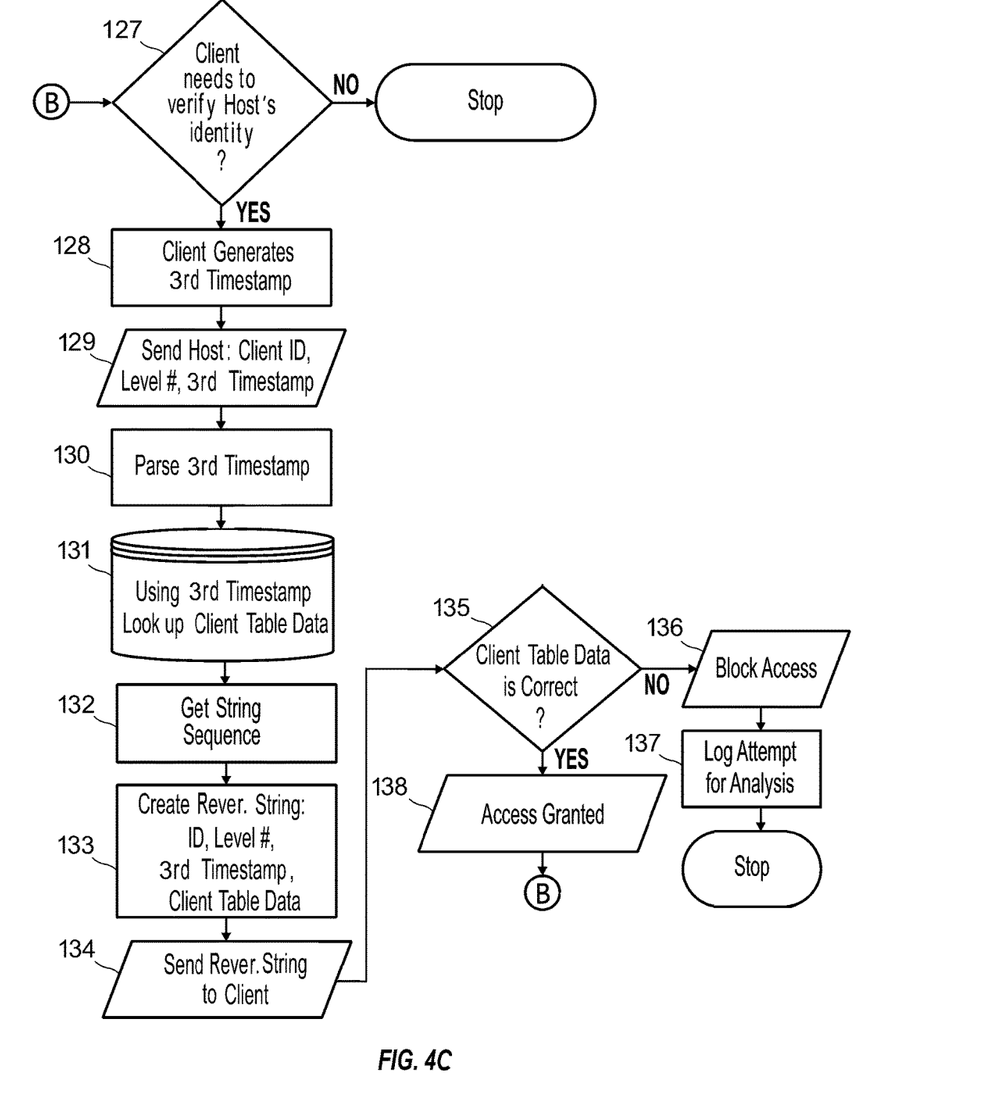

FIGS. 4A-4C together show the authentication method of the invention described where the client device 24 (see FIG. 1) is attempting to gain authorized access to the host device 22 (see FIG. 1). Referring first to FIG. 4A, in step 101, the client device 24 generates a first timestamp with its clock 25 based on the current time. The first timestamp includes eight time units: year, month, week, day of month, hour of day, minute, second, and millisecond. In step 102, the client device 24 parses the first timestamp to retrieve the values of each time unit. In step 103, using the values retrieved in step 103, the client device 24 retrieves, from the host string table 47, a first group of character strings related to time unit values of the first timestamp. In step 104, the client device 24 retrieves the string sequence from the client sequence table 46.

In step 105, the client device 24 generates an initiating string that includes the client device's 24 device identifier 49, the current security level of the client device 24, the first timestamp, and a first string set formed by concatenating the first group of character strings in the order retrieved in step 104.

Referring to FIG. 2, for example, if the timestamp represents Jul. 7, 2015 at 06:04:02.002 (which falls in the 27th week of the year), the order of concatenation based on the host sequence table 45 (which is identical to host sequence table 33) (FIG. 2) is: second, hour, day, millisecond, week, year, minute, month. Assembling the strings from the host string table 47 (FIG. 3) in this order, the concatenated first string set is: 8nB494RQ 2tLeA1CN fK1lB4mP tK977810 Z5i59S3J pM281J5u W5oAQ0ck S9i9JXhv (spaces have been inserted between each string for readability in the application, but are not included in the first string set). In alternative embodiments, the character strings may be of differing lengths, which provides an added layer of security by preventing an eavesdropper from being able to predictably determine where each character string starts within the first string set.

In step 106, the client device 24 sends the initiating string to the host device 22. When the host device 22 receives the initiating string, it verifies (step 107) the data format is correct and the client device 24 is among those network devices that may, subject to completion of the authorization process, access to the host device 22. If the format is not correct or if the device 24 is barred from access, the host device 22 blocks the connection (step 117) and the process stops.

In step 110, the host device 22 reads the initiating string, including the first string set and the timestamp, and retrieves, from the corresponding host table, a second group of character strings, each related to a time unit value of the first timestamp. These are concatenated in an order determined by the host sequence table 33 into a second string set. In step 111, the host device 22 compares the first string set with the second string set. If the first string set does not match the second string set, the host device 22 blocks access (step 117) and the device ID and timestamp are recorded (step 118) so that any subsequent attempts by the client device 24 to access the host device 22 are blocked automatically, and the method stops.

If the first string set matches the second string set, the host device 22 generates a second timestamp (step 114) with eight time units, which it sends to the client device 24 (step 115). Upon receipt of the second timestamp, the client device 24 parses the second timestamp to retrieve the values of each time unit (116).

Referring to FIG. 4B, in step 119, the client device 24 retrieves, from the local client table for the appropriate security level, a third group of character strings, each related to a time unit value of the second timestamp. In step 120, the client device 24 retrieves the string sequence from the client sequence table 46. In step 121, the client device 24 generates a verification string that includes the client device's 24 device identifier 49, the security level of the client device 24, and a third string set formed by concatenating the third group of character strings in an order determined by the client sequence table 46. The client device 24 then sends the verification string to the host device (step 122).

In step 123, the host device 22 retrieves, from the client table associated with the client device 24 and appropriate security level, a fourth group of character strings related to time unit values of the second timestamp. These are concatenated into a fourth string set in an order determined by the client sequence table 34 corresponding to the device ID 49 of the client device 24. The host device 22 compares the third string set with the fourth string set. If they are identical, the host device 22 grants access to the next stage of the login process (step 126) (e.g., password login), if any, and the process continues. If the information is incorrect, access is blocked (step 117), and the device ID and timestamp are recorded (step 118) so that any subsequent attempts by the client device 24 to access the host device 22 are blocked automatically, and the method stops.

Referring to FIG. 4C, if the client device 24 needs to intermittently re-verify the identity of the host device 22 (step 127), after this initial authentication is complete, the client device generates a third timestamp (step 128). In step 129, the client device 24 sends the device ID 49, the security level of the client device 24, and the third timestamp to the host device 22.

When received, the host device 22 parses the third timestamp to retrieve the values of each time unit (step 130). In step 130, using the values retrieved in step 131, the host device 24 retrieves, from the client string table 40, a fifth group of character strings related to time unit values of the third timestamp. In step 132, the host device 24 retrieves the string sequence from the client sequence table 34.

In step 133, the host device 22 generates a re-verification string that includes the client device's 24 device ID 49, the security level of the client device 24, the third timestamp, and a fifth string set formed by concatenating the fifth group of character strings in the order retrieved in step 132. The host device 22 then sends the re-verification string to the client device 24 (step 134), When the client device 24 receives the re-verification string, it verifies (step 135) the data format is correct and the host device 22 is among those network devices that may, subject to completion of the authorization process, continue to access the client device 24. If the format is not correct or if the host device 22 is barred from access, the client device 24 blocks or breaks the connection (step 136), and the event recorded (step 137) so that any subsequent attempts by the host device 22 to access the client device 24 are blocked automatically, and the method stops.

In step 135, the client device 24 reads the re-verification string, including the fifth string set and the third timestamp, and retrieves, from the corresponding client table, a sixth group of character strings, each related to a time unit value of the third timestamp. These are concatenated in an order determined by the client sequence table 33 into a sixth string set. The client device 24 compares the fifth string set with the sixth string set. If the fifth string set does not match the sixth string set, the client device 24 blocks access (step 136) and the device ID and timestamp are recorded (step 137), and the method stops. If the fifth string set matches the sixth string set, the host device 22 access is granted or uninterrupted (step 138). Steps 127-138 may be repeated as needed by the system with additional (e.g., fourth, fifth, and so on) timestamps and corresponding string sets.

The present invention is described in terms of a specifically described embodiment. Those skilled in the art will recognize that other embodiments of such method and system can be used in carrying out the present invention. For example, this invention also contemplates the use of other data structures for transmission of the data including, but not limited to, matrixes, encoded data or any other form in use now or in the future. The creation of the second and fourth concatenated strings to create comparison strings is only one embodiment of this invention. Other aspects and advantages of the present invention may be obtained from a study of this disclosure and the drawings, along with the appended claims.

I claim:

1. A method for authenticating a client device for access to a host device, the client device having a device identifier, the method comprising the steps of:

generating a first timestamp in the client device, the first timestamp including at least two time unit values;

retrieving a first group of character strings from a host string table in the client device, each character string within the first group being related within the host string table to a time unit value of the first timestamp;

combining the first group of character strings into a first string set;

creating an initiating string in the client device, the initiating string including the device identifier, the first timestamp, and the first string set;

sending the initiating string to the host device;

retrieving a second group of character strings from a host string table in the host device, each character string within the second group being related within the host string table to a time unit value of the first timestamp;

combining the second group of character strings into a second string set;

comparing the first string set to the second string set;

generating a second timestamp in the host device, the second timestamp including at least two time unit values;

sending the second timestamp to the client device;

retrieving a third group of character strings from a client string table in the client device, each character string within the third group being related within the client string table to a time unit value of the second timestamp;

combining the third group of character strings into a third string set;

creating a verification string in the client device, the verification string including the device identifier, the second timestamp, and the third string set;

sending the verification string to the host device;

retrieving a fourth group of character strings from a client string table in the host device, the client string table being associated with the client device, each character string within the fourth group being related within the client string table to a time unit value of the second timestamp;

combining the fourth group of character strings into a fourth string set; and comparing the fourth string set with the third string set;

granting the client device access to an advanced login stage when the fourth string set is identical to the third string set;

generating a third timestamp in the client device, the third timestamp including at least two time unit values;

sending the third timestamp to the host device;

retrieving a fifth group of character strings from a client string table in the host device, each character string within the fifth group being related within the client string table to a time unit value of the third timestamp;

concatenating the fifth group of character strings into a fifth string set in an order determined by a client sequence table in the host device, the client sequence table relating an order of time units to the value of one of the time units;

sending the third timestamp and third string set to the client device;

retrieving a sixth group of character strings from a client string table in the client device, each character string within the sixth group being related within the client string table to a time unit value of the third timestamp;

concatenating the sixth group of character strings into an order determined by a client sequence table in the client device, the client sequence table relating an order of time units to a time unit value of the third timestamp; and comparing the sixth string set with the fifth string set; and blocking the host device from accessing the client device when the fifth string set does not match the sixth string set.

2. The method of claim 1 wherein:

the step of combining the first group of character strings includes concatenating the first group of character strings into the first string set in an order determined by a host sequence table in the client device, the host sequence table relating an order of time units to a time unit value of the first timestamp;

the step of combining the second group of character strings includes concatenating the second group of character strings into the second string set in an order determined by the host sequence table in the host device, the host sequence table relating an order of time units to the value of one of the time units;

the step of combining the third group of character strings includes concatenating the third group of character strings into the third string set in an order determined by the client sequence table in the client device, the client sequence table relating an order of time units to a time unit value of the second timestamp; and the step of combining the fourth group of character strings includes concatenating the fourth group of character strings into the fourth string set in an order determined by the client sequence table within the host device, the client sequence table associated within the client device and relating an order of time units to the value of one of the time units.

* * * * *